No. 753,840. PATENTED MAR. 8, 1904.
C. G. BARTH, H. L. GANTT & F. W. TAYLOR.
SLIDE RULE.
APPLICATION FILED NOV. 20, 1901.
NO MODEL. 5 SHEETS—SHEET 1.

WITNESSES:

INVENTORS:
Carl G. Barth.
Henry L. Gantt
Frederick W. Taylor

No. 753,840. PATENTED MAR. 8, 1904.
C. G. BARTH, H. L. GANTT & F. W. TAYLOR.
SLIDE RULE.
APPLICATION FILED NOV. 20, 1901.
NO MODEL. 5 SHEETS—SHEET 2.

WITNESSES:

INVENTORS:
Carl G. Barth.
Henry L. Gantt
Frederick W. Taylor

No. 753,840. PATENTED MAR. 8, 1904.
C. G. BARTH, H. L. GANTT & F. W. TAYLOR.
SLIDE RULE.
APPLICATION FILED NOV. 20, 1901.
NO MODEL. 5 SHEETS—SHEET 3.

WITNESSES: INVENTORS:
Carl G. Barth.
Henry L. Gantt
Frederick W. Taylor.

FIG. 14.

No. 753,840. PATENTED MAR. 8, 1904.
C. G. BARTH, H. L. GANTT & F. W. TAYLOR.
SLIDE RULE.
APPLICATION FILED NOV. 20, 1901.
NO MODEL. 5 SHEETS—SHEET 5.

FIG. 15.

WITNESSES:
INVENTORS:
Carl G. Barth.
Henry L. Gantt
Frederick W. Taylor

No. 753,840. Patented March 8, 1904.

UNITED STATES PATENT OFFICE.

CARL G. BARTH, OF BETHLEHEM, AND HENRY L. GANTT AND FREDERICK W. TAYLOR, OF SOUTH BETHLEHEM, PENNSYLVANIA.

SLIDE-RULE.

SPECIFICATION forming part of Letters Patent No. 753,840, dated March 8, 1904.

Application filed November 20, 1901. Serial No. 82,998. (No model.)

*To all whom it may concern:*

Be it known that we, CARL G. BARTH, a resident of Bethlehem, and HENRY L. GANTT and FREDERICK W. TAYLOR, residents of South Bethlehem, in the county of Northampton, State of Pennsylvania, all citizens of the United States of America, have invented certain new and useful Improvements in Slide-Rules, of which the following is a true and exact description, reference being had to the accompanying drawings, which form a part thereof.

Our invention relates to slide-rules.

The chief object of our invention is to enlarge the scope of these useful and time-saving instruments.

Other objects include hereinafter specifically-defined constructive details.

Our still further objects will be best understood from this specification as a whole.

Our invention is addressed to problems which may be said, in mathematical language, to involve more than one equation or set of relations between the variables entering into the problem. Of these variables, in any particular case under consideration, some are known and others, and as many as there are equations in the case to be solved, are unknown.

Our invention in its broad aspect may be said to consist in the construction of a slide-rule which gives answer to above classified problems.

In carrying our invention into practice we incorporate upon a slide-rule, and preferably upon attached sections thereof, distinct mechanical embodiments—such as logarithmic scales, linear or circular—recognized as means of representing the variable arithmetical values insertable in those formulæ or equations which as above set forth are incident to the problems solvable by our slide-rules.

Reference now being had to the aforesaid drawings, they will be found to illustrate our invention as follows:

Fig. 4 is a plan view of another embodiment of our invention, adapted to the solution of a different specific problem from that which is within the scope of the rule shown in Figs. 1 and 2.

As a premise to the description of those of the illustrated slide-rules that display rectilinear scales we shall take up the more purely-mechanical detail of their sliding parts.

Figure 1:
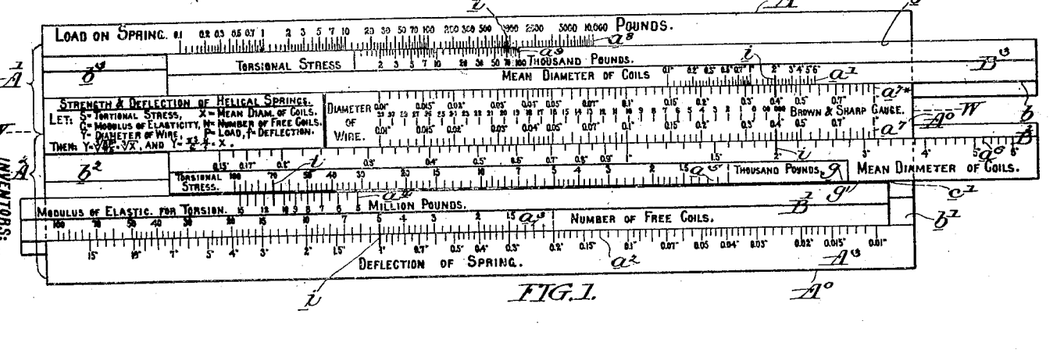
Figure 1 is a plan view of a slide-rule embodying our invention in a single instrument.

In Fig. 1 the slides B' B² B³ are all similarly-dimensioned prismatic bodies of Z-section. (See end view, Fig. 2.) The guides, in which they work lengthwise, are Z-slots $b'$ $b^2$ $b^3$, sunk in parallel and running along the relatively fixed base A⁰ from end to end of the rule. (See Figs. 1 and 2 in conjunction.) This relatively fixed part A⁰ of the slide-rule is in this instance of united sections A' A² and displays (on its face A³ flush with the scale-bearing surfaces, hereinafter identified, of the slides B' B³) certain of the aforesaid logarithmic scales. We preferably fit the slides carrying such rectilinear scales with the slightest possible frictional contact to their respective guide-slots. This sort of fit, with the interlocking engagement incident to an increased cross-section below the waist $b$ of such slides, (see slides B' B², Fig. 2, also B³¹ to B³³, Fig. 3, and B⁴¹ to B⁴⁵ in Fig. 5,) we find sufficient in average usage for the self-retention to its base of any isolated slide, as slide B³, Figs. 1 and 2; but in the case of such adjoining slides, as the twins B' B², Figs. 1, 2, whereof the scale-bearing margins $g'$ $g^2$ should, for easily determining the incidents of their scale-lines, come close alongside each other, we preferably contrive that a very small "clearance"—exaggerated for drafting reasons—at $c'$ shall separate their upper and otherwise meeting flanges $b^4$ $b^5$, and by reason of the closer fit which we form between the opposite flanges $b^6$ $b^7$ of each said Z-shaped slide and said flanges' corresponding female parts $b^8$ $b^9$ of the slots that guide them (see Fig. 2) it is contrived that each slot and slide of the twin and neighboring workmates B' B², thus laterally restricted to less limits than said clearance, shall coöperate to prevent either slide when moving in its guide from dislocating its mate. The great convenience of this in adjoining twin slides only need to be stated to be appreciated.

While we prefer the Z-section thus illustrated for adjoining twin scales, when it comes to three adjoining neighbors in a block, as is the case in Fig. 4, we contrive, preferably, a U-section for the intermediate slide, here B⁴¹. This slide at its waist $b^0$ (see Fig. 5) being close fitted laterally, but not too snugly for sliding between the guide-faces $b^{11}$ $b^{12}$, is also cleared at $c^2$ $c^3$ from the top flanges $b^4$ $b^5$ of its flanking neighbors, whereby said neighbors can each be worked with absolute independence. Also where by the exigencies of the problems to which our slide-rules are appropriate a number of mutually-flanking slides greater than three is required we have contrived I-shaped symmetrical slides, such as B³¹ B³² B³³ of Fig. 3. These slides, cleared between their upper adjoining flanges—viz., at $c^{31}$ $c^{32}$—and laterally snug-fitted to their guides in their narrow waists $b^{30}$, &c., can be severally manipulated with a corresponding freedom from mutual dislocation.

Figure 3:
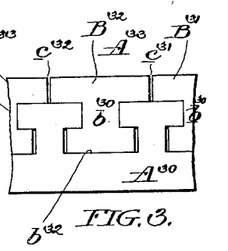
Fig. 3 is an end elevation of a fragment of a modification giving other details of construction in the more purely mechanical combinations of one of our rules.

In the modification Fig. 3 it will be noted that the cleared top flanges of the I-section slides B³¹, &c., stand free and lying abreast form a requisite flush face A³³ for the mechanical embodiment in close juxtaposition of the desired scales.

Figure 5:
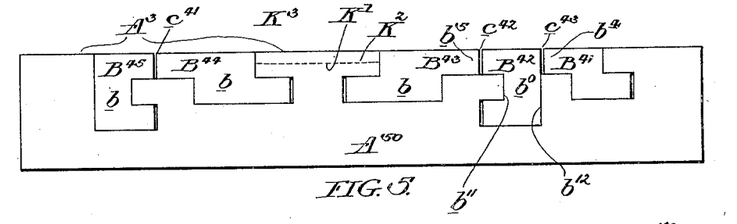
Fig. 5 is an end elevation, on a a larger scale, of the slide-rule shown in Fig. 4.
Figures 6, 7:
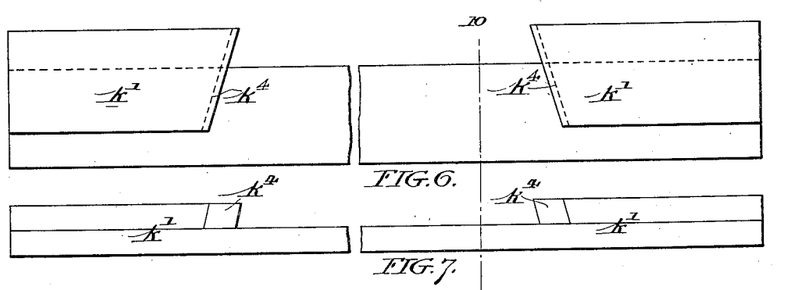
Figs. 6 and 7 are fragmented plan and side elevations, respectively, of the carrier part of a composite slide seen removed from its base or relatively fixed part of its rule and constitutes an ancillary detail of our invention.
Figures 8, 9, 10:
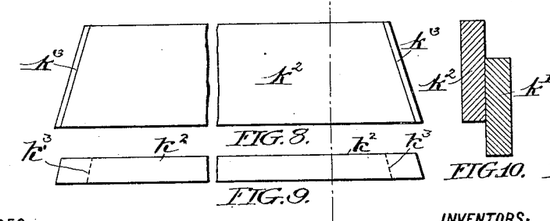
Figs. 8 and 9 are plan and side elevations, respectively, of a carried part of said composite slide, the same being typical of an interchangeable lot of similar parts any one of which having embodied upon it a germane logarithmic scale, &c., may by manual insertion be interlockingly engaged and then as a composite slide insertible for working in its proper guide of a slide-rule.
Figs. 10 and 11 are cross-section and end view, respectively, of the composite slide shown in Figs. 6, 7, 8, and 9, wherein broken line 10 10 denotes plane of section in Fig. 10.
Figure 11:
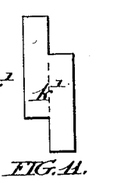

In some cases a rule, more especially such as shown in Figs. 1 2, and 3, 4, may call for scale or scale part different from that with which the instrument is at some time equipped. To this end we have devised and combined in a slide-rule a detachable scale-bearing part or parts, viz:

First. If in the relatively fixed part or parts of the rule we do so, preferably as shown in Figs. 4, 5, by a detachable block K', here a right parallelopiped formed and fitted to lie flush in a registering sunk chamber K², and from the face of said block, preferably at one end, countersink an undercut finger-hold K³, by which "hold" the user can when desired prize out such block from its chamber, it is obvious such block may be taken as typical of an interchangeable series of blocks, upon which of course any desired and germane scale or scale part could be embodied and of which any one can therefore be put in the exact place of the removed one.

Second. If it is desired to make a change of scale in a slide, we have devised and combined in a slide-rule the composite slide already, as to Figs. 6 to 11, partially described in the catalogue of figures. Of it there is, however, to be added that as a means of initially interlocking the carrier part $k'$ with the carried part $k^2$ we preferably provide the same with male and female, $k^3$, interlocking rabbets. The illustrations Figs. 6 to 12 give a form thereof which we have found efficient—to wit, the carried part $k^2$, with male skew-chamfered ends $k^3$ so fitted to and dovetailing with registering female seats $k^4$, sunk in the carrier part $k'$, that the said skew-chamfered portions serve when the two are assembled to keep the carried part $k^2$ in a proper alined embrace of the other, $k'$.

Figure 2:
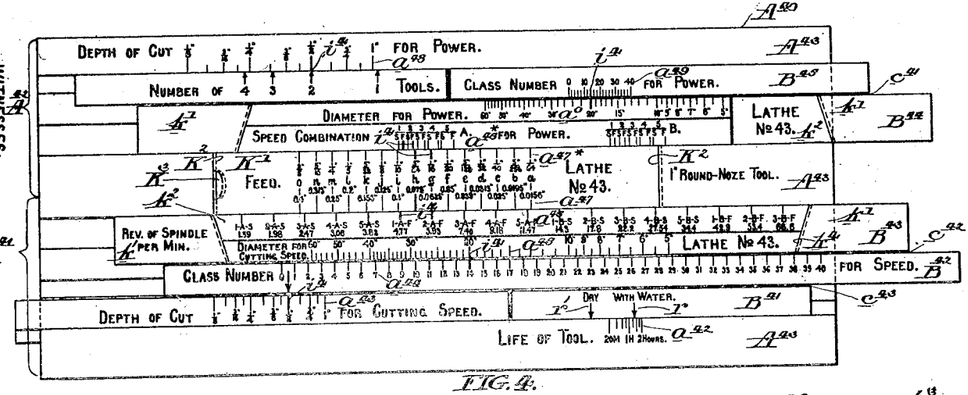
Fig. 2 is an end elevation of the same on a larger scale.

Taking aforesaid illustrative embodiments *seriatim*, we now proceed further to describe them as follows: The rule shown in Figs. 1, 2 is contrived to give answers to those problems of the indicated class which in designing arise as to the "strength" and "deflection" of helical springs. To this end the formulæ shown in label C, Fig. 1, symbolically express the two equations, or sets of relations, between the variables entering into the problems of this rule's scope. The said formulæ are thus displayed upon the rule's face A³ as a convenient means of preventing mistaken selections in the manipulation of the several sliding and fixed parts of the rule. Moreover, in them, $x$ and $y$, the conventional symbols for such purpose designate the two unknown variables.

Inspection of this rule will also show that every scale (indicated at $a'$, &c.) is for a similar precaution labeled with its own terse title. We have also indicated by broken line W W that this rule, which is physically united into a single instrument, may yet be considered as divisible into two sections $A'$ $A^2$, respectively. One of these sections is given up to logarithmic scales, (identified by $a^2$ to $a^7$,) which mechanically embody the "formula for deflection" of helical springs. (See label C.) To this formula, as is understood by those skilled in the art of spring-designing, there is a second, to wit, a "formula for load" of helical springs. To this latter formula the other, or $A^2$, section of this rule is appropriated, and thereon in Fig. 1 will be seen other logarithmic scales, (indicated by $a^8$ $a^9$ $a'$ $a^{7 \times}$,) by means of which said second formula also becomes a component in the rule. Now of these several logarithmic scales the scales $a^2$ and $a^7$ (of the equation for deflection) are on the fixed parts $A^0$ of their proper section $A'$, and the scales $a^8$ and $a^{7 \times}$ are upon the fixed or base portion of $A^0$ of their section $A^2$ of the slide-rule. Upon the face or plan side, Fig. 1, of slide $B'$ is the scale $a^3$, which scale expresses the "number of free coils," a variable subject to ascertainment in any given case, and which (designated as N) appears in the formula for deflection, label C. Scale $a^4$ is a similar logarithmic expression mechanically embodied on slide $B'$ for the "modulus of elasticity," another variable term in same formula. Scales $a^5$ and $a^6$ on margins of slide $B^2$ express within their limits other variables of the same (deflection) formula—viz., that of the "torsional stress" and of "mean diameter" of coil. (See label C.) Of these, $a^6$ is to be distinguished from those preceding it, ($a^2$ to $a^5$,) being the mechanical embodiment of one of the unknown variables of said formula and which same unknown variable, but in a different logarithmic scale $a'$, also appears on the inside of slide $B^3$ of the aforesaid formula for load or $A^2$ section of the rule.

In the relatively fixed middle part of the slide-rule between scales $a^6$ and $a'$ is plotted the, as it were, split or duplex logarithmic scale $a^7$ $a^{7 \times}$. This scale mechanically embodies in the rule the other unknown variable of or common to both aforesaid formulæ—viz., "diameter of wire." It is also to be noted that distributed along this fixed middle part of the rule and sandwiched between scales $a^7$ $a^{7 \times}$ (along line W W) is a logarithmix tabulation of "Brown & Sharpe's" wire-gage. This tabulation is introduced simply as an additional convenience, so that when (as set forth in the next ensuing example of this rule's use) the rule having been set to the requirements of a given case within its scope and it consequently reveals the answer there may be shown as near as may be to said answer the nearest size of wire that the Brown & Sharpe's gage can with respect to safety afford.

As an example of the duplex function of the rule shown in Figs. 1 and 2 we will suppose that the designer wants to ascertain what "mean diameter of coils" and of what "diameter of wire" a helical steel spring of five "free coils" must be made in order to safely sustain a "load" of ninety pounds under a deflection of one inch when the material to be used has a "modulus of elasticity for torsion" of eleven million pounds and can work safely under a torsional stress of seventy thousand pounds.

First. To satisfy the requirement of load, we so adjust the slide $B^3$ that the seventy thousand pounds graduation-mark on the scale marked "torsional stress" coincides with the ninety pounds graduation-mark on the "load" scale, when we at once have before our eyes all simultaneous values of wire and coil diameters that will satisfy this one requirement.

Second. To satisfy the requirement of deflection, we so adjust the slide $B'$ that the graduation-mark 5 on the scale of "number of free coils" coincides with the one-inch graduation-mark on the scale of deflection and then also so adjust slide $B^2$ that the seventy thousand pounds graduation-mark on the scale marked "torsional stress" coincides with the eleven million pounds graduation-mark on the scale marked "modulus of elasticity for torsion," when we also at once have before our eyes all possible combinations of coil and wire diameter that will satisfy the requirement as to deflection.

For a person familiar with the instrument the particular values of coil and wire diameter that at the same time satisfy both requirements are then at once revealed, these being in this particular case a two-inch diameter of coil and 0.4 of an inch diameter of wire, as more clearly pointed out by the coincident graduation-marks of this example being made in heavier lines $i$ than the rest.

The lathe slide-rule shown in Figs. 4 and 5 is typical of a class of our slide-rules designed for the purpose of determining under certain conditions the feed and speed at which to run a machine-tool in order to remove the greatest amount of material in the shortest possible time.

As a preliminary to the construction of such an instrument as the slide-rule shown in Figs. 4 and 5 typifies we made extensive study of the relations between the size and shape of a cutting-tool working on various materials, the depth and feed of the cut, the cutting speed, and the length of time the tool will stand up to the work, and we found that these relations were of such a nature that they could be reduced with a high degree of accuracy to mathematical formulæ of the kind which may be embodied in a logarithmic slide-rule. We have already constructed such instruments for lathes, planers, and drill-presses, respectively. Of these the particular slide-rule illustrated in Figs. 4 and 5 is typical. It is so arranged that it may be used for any lathe whose speed and power "combinations" fall within its limits. In the first place to this protean end the two slides $B^{43}$ and $B^{44}$ hereof are of the composite type above described in connection with Figs. 6 to 11, and, secondly, the duplex scale $a^{47}$ $a^{47\times}$ in the middle of the instrument is also only, as hereinabove described, a temporarily-inserted one. It is in this instance that part of the rule which carries the scale of feeds available on the particular lathe for which for the time being the slide-rule, Figs. 4 and 5, is equipped, here a lathe designated for particularization only as "No. 43." Lathe No. 43 to be presumed is of the ordinary cone-pulley belt-driven class, its cones having five steps, designated from the largest to the smallest on the cone of its head-stock by "1," "2," "3," "4," and "5." It also has two combinations of reducing or "back" gears between its head-stock cone and its spindle, the greater reduction being designated by "A" and the lesser as "B." The counter-cone of lathe 43 is itself provided with two different speeds, the slower of which speeds is designated by "S" and the faster by "F." So the lathe 43 has consequently in all twenty different speed and power combinations, of which number, however, only eighteen, for consideration of space, have been put on the slide-rule, Figs. 4 and 5. So equipped and nomenclatured such a lathe as No. 43 will be recognized and familiar to machine-tool makers.

On the lower or "speed" section $A^{42}$ of the slide-rule, Figs. 4 and 5, are logarithmic scales mechanically embodying the law of relation (developed as aforesaid) between the "life of tool" or the length of time the tool will stand up to the work, (scale $a^{42}$,) the use or non-use of a cooling-stream of water on the tool, (the broad arrows on scale $B^{42}$, exponented "dry" and "with water," respectively,) the "depth of cut," (scale $a^{43}$,) the "class number for speed" of material being cut, (scale $a^{44}$,) the cutting speed or "revolutions of spindle per minute" resulting from a piece of work of a certain diameter making a certain number of revolutions per minute, (scales $a^{45}$ $a^{46}$, respectively, both on slide $B^{43}$,) and the "feed," for which latter unknown variable see neighboring part, or $A^{42}$ section of duplex logarithmic scale $a^{47}$ $a^{47\times}$, embodied marginally in a split fashion upon the (in this case) relatively fixed middle part of the slide-rule. This scale $a^{47}$ $a^{47\times}$ is for convenience numbered and marked not only marginally in decimal and vulgar fractional parts of an inch, but centrally also by an alphabetical scale of the similarly-marked parts, which in our correlated lathe No. 43 mechanically embody its feed-controlling devices. This law thus embodied upon the slide-rule constitutes one equation of the general problem characteristics of lathe No. 43, the unknown variables or quantities of which are respectively the "speed combinations" (see scale $a^{46}$, slide $B^{43}$) and the "feed." (See adjoining side of duplex scale $a^{47}$ $a^{47\times}$.) On the upper or "power" section $A^{42}$ of this slide-rule is embodied the law of relations between the "depth of the cut," (fixed scale $a^{48}$,) the "number of the tools" taking the cut, (scale of broad arrows exponented 1 to 4 on slide $B^{45}$,) the "class number for power" of the material being cut, (scale $a^{49}$, also on slide $B^{45}$,) the pressure available on the tool as the result of belt-pulling on a cone-step of lathe No. 43 of a certain diameter, (scale $a^{0}$ of slide $B^{45}$,) through a certain back-gear "speed combination," (the, from the nature of the lathe No. 43, non-continuous scale $a^{40*}$, exponented "A" and "B" on slide $B^{44}$,) and on to a certain diameter of work, "the feed," (mechanically embodied in the adjoining or $A^{41}$ side of the duplex scale $a^{47}$.) This, the second equation of the problem for which the rule shown in Figs. 4, 5 is equipped, we, as indicated by the bracketed references, mechanically embody thereon. This slide-rule also comprises sections $A^{41}$ $A^{42}$, preferably united into a single instrument in which the mechanical embodiments of its problems' unknown variables when the rule is set merge into a common field of vision whereby the rule becomes in any particular case an instrument apt to reveal its answer. The ultimate stage of the solution effected by this instrument, Figs. 4 and 5, may seem to be obtained not so directly as is the clear-cut solution of the problem illustrated as an example in connection with the slide-rule for helical springs, Figs. 1 and 2, for it frequently happens that more than one "speed and power combination" will at the same time satisfy the requirement of utilizing, together with its coincident feed, both the full pulling power of the lathe and all there is of durability in the cutting tool or tools. However, the interdependence of feed and cutting speed under otherwise fixed conditions is such that of two or more exact solutions the one that implies the coarsest feed will remove the most metal in a given time or, in other words, cause lathe No. 43 to remove a certain amount of metal from the selected work in a minimum of time. In addition to this the lathe under consideration has in common with the rest of its class only a limited number both of feeds and of speed and power combinations, so that as a rule but approximate solutions of the problem will appear on the instrument. In such cases special means, which will be explained in the example next to be described, must be resorted to for the determination of that one of two or more approximate solutions which will satisfy the ultimate requirement of a minimum consumption of time for a certain work.

Such a lathe as No. 43, being usual and purely collateral to the description of this slide-rule, (appropriate to it,) needs no further particularization nor, it is assumed, any illustrative figures.

As illustrated, the slide-rule, Figs. 4 and 5, is set, first in one section, for the following conditions concerning the cutting tool or tools of lathe No. 43, viz:

A. Upon section $A^{41}$, which is appropriate to the speed at which work is urged upon the tool, we select, say, first, tool to stand up to the work for one hour, twenty minutes, (life of tool,) fixed scale $a^{42}$; second, a stream of water to be used on the tool, ("with water,") arrow $r^{41}$, slide $B^{41}$, but if dry set at arrow $r^{40}$; third, a one-half-inch depth of cut to be taken, (set at one-half inch, scale $a^{43}$, slide $B^{42}$;) fourth, class No. 14 of material in work, (set graduation 14, scale $a^{44}$, slide $B^{42}$;) fifth, twenty-inch diameter of work, (set twenty-inch, scale $a^{45}$ on slide $B^{43}$.) Concerning the pulling power of the lathe, the rule upon section $A^{41}$ is next set.

B. By corresponding manipulations of slides $B^{45}$ and $B^{44}$ to satisfy, of the above-given conditions, Nos. 3, 4, and 5, and besides by the appropriate setting of broad arrow "2," the condition that two cutting-tools are to be used at the same time. The instrument being thus set on both section $A^{41} A^{42}$, it first appears that there is no feed so fine that any of the "speed and power combinations" within the "B" gear reduction (see slide $B^{44}$, scale $a^{46*}$) would pull the two cuts, so we at once confine ourselves to the consideration of the "A" combinations. On doing this we readily discover that the combination 1 A F is the only one that appears nearly opposite to itself in both sections of the instrument; but unfortunately the $i$ feed is a trifle too coarse both for the pulling power and the life of the tool, so that we are limited to the $h$ feed, which feed will neither utilize the full pulling power of the combination 1 A F nor the possibility of the cutting-tool in the life-limit put upon it. For this reason it at once becomes a question whether the combination 2 A F, which in the "speed-section" ($A^{41}$) of the instrument is seen to just coincide with the $g$ feed, will not be more advantageous in spite of said $g$ feed being finer than the $h$ feed and the failure of this combination to utilize all its pulling power in connection with the $g$ feed. This latter question is readily settled by comparing the ratio which the two feeds $h$ and $g$ bear to each other to the inverse ratio that the spindle revolutions corresponding to the two combinations 2 A F and 1 A F bear to each other. We thus have $$\frac{h}{g} = \frac{0.078}{0.625} = 1.248$$

and $$\frac{2 \text{ A F}}{1 \text{ A F}} = \frac{5.93}{4.77} = 1.243.$$

The ratio $\frac{h}{g}$ being thus a trifle greater than the ratio $\frac{2 \text{ A F}}{1 \text{ A F}}$, we realize that we gain more by using the slower combination 1 A F with the coarser feed $h$ than by using the faster combination 2 A F with the finer feed $g$, while the gain in this instance is hardly a consideration. However, as equal ratios on the same logarithmic scale are represented by equal distances and equal ratios on two logarithmic scales of different dimensions are represented by proportional distances the arithmetical work done above may be performed by means of a pair of proportional dividers so set that its one end will give the same ratio on the scale of speed combinations $a^{46}$ on the slide $B^{43}$ that its other end will give on the scale of feeds. In fact, whenever the difference between the two ratios to be compared is a real item the comparison is readily made by the eye alone of the skilful manipulator, and we are therefore justified in stating that this instrument, as well as the one shown in Figs. 1 and 2, reveals the answer.

Figure 12:
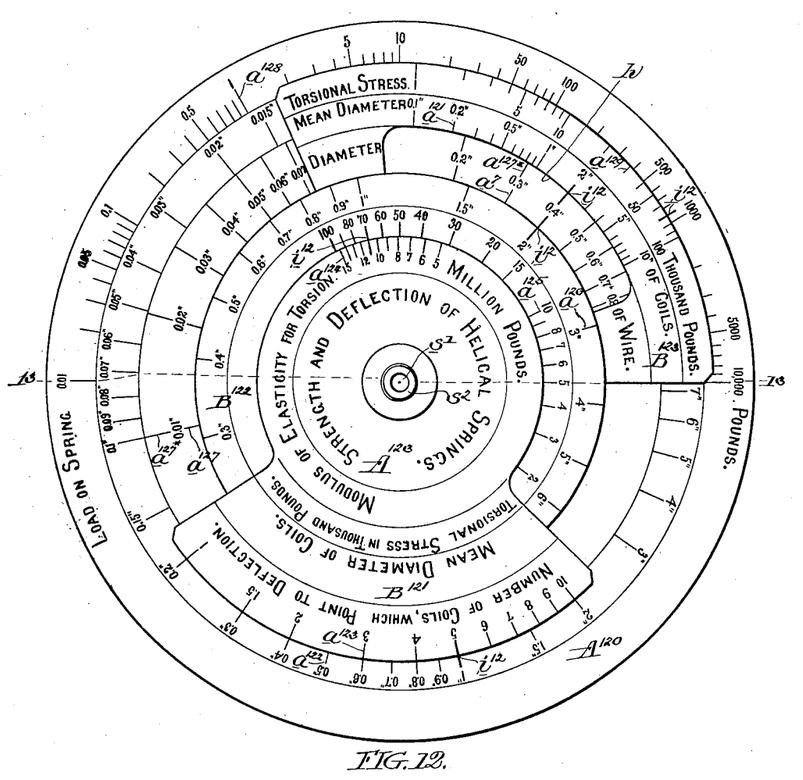
Fig. 12 is a plan view of an embodiment of our invention to solve the same problems as those solved by the instruments shown in Figs. 1 and 2; but instead of the logarithmic scales being embodied in rectilinear arrangement, as they are in said prior instance, the same are here in circular arrangement. So, too, in Fig. 12 the slides of the circular instrument instead of being nested in a base have a disk-like form and are piled in order one upon the other and adapted, as is usual in circular slide-rules, to swing over each other about a common center.
Figure 13:
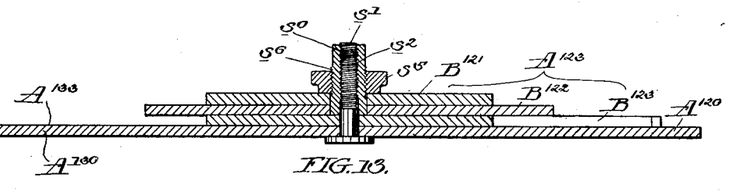
Fig. 13 is a cross-section on median line 13 13 of the rule shown in Fig. 12.

The circular slide-rule, Figs. 12, 13, is to give answer to substantially the same general problem as the straight rule described in connection with Figs. 1, 2. The equations on which that instrument is based, therefore, are again mechanically embodied on this rule, the chief difference being that conforming to the general plan of this modification the like scales ($a^{121}$ to $a^{127} a^{127\times}$) thereof are in circular arrangement and only for the sake of simplicity less finely subdivided. This slide-rule is also, as indicated by coincident heavy-faced lines $i^{12}$ among its said scales, "set" to and gives on inspection of its self-indicated field of vision (see the concentrated similar groups of graduations upon the scales of the unknown variables thereof— viz., of scales $a^{126}$ and $a^{121}$,) and, in the same manner, as first above explained in reference to the rule shown in Figs. 1, 2, reveals the answer.

As to the mechanical detail of the rule, Figs. 12, 13, much will be familiar to those conversant with ordinary circular slide-rules, and therefore need not be described; but in addition it is proper here to point out that the base or relatively fixed part of the instrument is the flat disk $A^{120}$, that in said base's center is transversely fixed as the center about which the relatively movable slides $B^{121}$ $B^{122}$ $B^{123}$ swing a flat-headed screw-bolt $s'$. This bolt has engaged upon its screwed tip a combined sleeve-bolt and "milled" thumb-nut $s^2$. Of this nut the internal threads $s^0$ engage and work along bolt $s'$, thereby acting to bind or release, according to its turning, between said nut and the head of said bolt the base $A^{120}$ and the lowest slide $B^{123}$, a convenience to be availed of as soon as any two graduations, as $i^{12}$, on said parts are in any given case "set," which being done the two upper slides—viz., sector $B^{121}$ and disk $B^{122}$—obviously may be swung to any designated position without disturbance of the bound slide $B^{123}$. When they—viz., $B^{121}$ and $B^{122}$—are so set in accordance with the particular problems' terms, a thumb-nut $s^5$, engaged upon a screw $s^6$, formed on the external body of nut $s^2$, serves to bind the whole in place. Unscrewing of nuts $s^5$ and $s^2$ of course serves to release the parts on which they bear for resetting, &c., when such is desired. In order, compactly, to plot the (here) logarithmic scales expressive of the two equations incident to helical springs upon the rule shown in Figs. 12, 13, we found it desirable to depart somewhat from a strict sectional division of the instrument; but the several logarithmic scales going to make up such spring two distinct equations may, however, on inspection be clearly distinguished from each other. In order to see the scale $a^{127}$ $a^{127\times}$, if the disk $B^{123}$, which overlies it, be of opaque material we form in disk $B^{123}$ a sight-hole $h$.

If desirable, instead of having the two sections, as $A'$ $A^2$, of any of the above-illustrated rules physically united in a single instrument it is both possible and within the scope of our invention and its claims to use, say, the $A^{41}$ section of rule (shown in Fig. 4) to determine by its setting, which should now be understood and therefore unnecessary to be repeated, the limits definable between the (here) two unknown variables of any given problem of its scope, and then turning to the circular rule (shown in Fig. 14) to manipulate those parts of it— viz., in its section $A^{142}$—which carry (abridged and circular though they be) the scales which mechanically embody what we may call the "coöperative" equation of the particular problem whose answer is sought, then by setting the slides $B^{142}$ $B^{143}$ of that section to the known variables' values to cause to appear thereon another set of relations between the unknown variables of the problem in hand, which being within other limits than those determined as to the same unknown variables by the $A^{41}$ section of the rule (shown in Fig. 4) are useful to the computer for contrast with the former, and he, setting off the one against the other, soon acquires a facility in discovering the answer common to both, which answer of course is the one sought. While it is within the scope of and flows from our invention in its broad aspect, such a resort to separate rule-sections is naturally at the cost of a lesser convenience and celerity that exists when the answer stands revealed upon preferably united sections or self-contained instruments.

Figure 14:
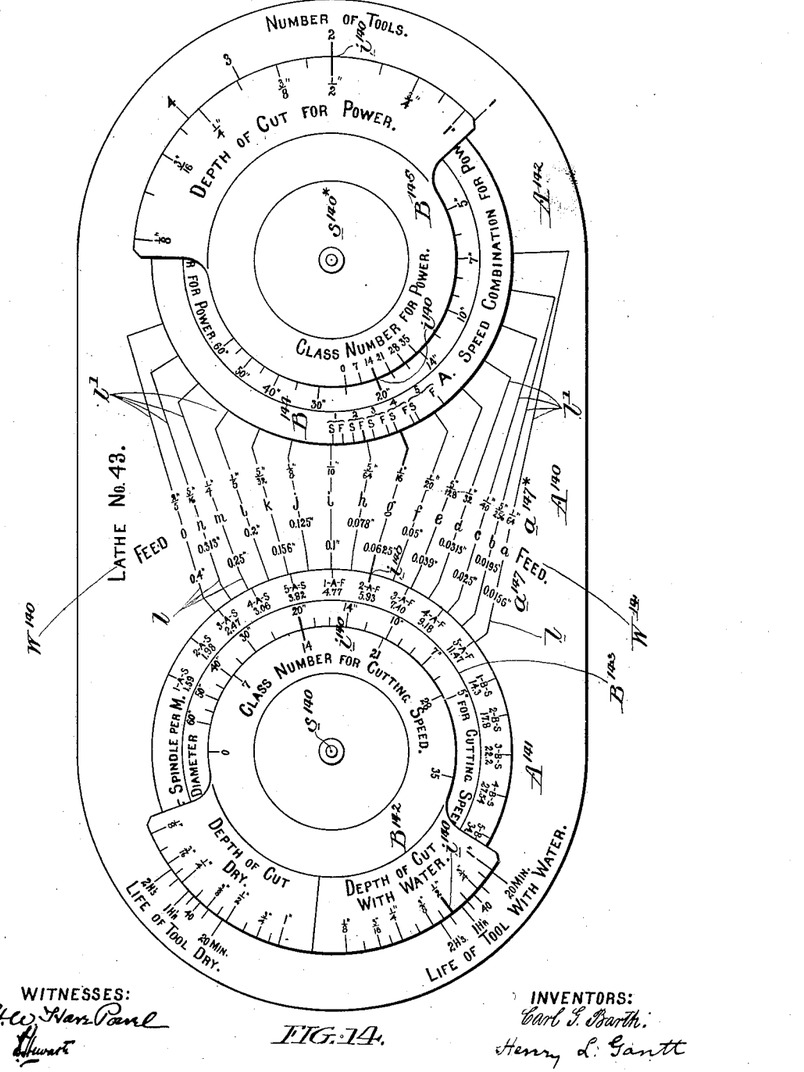
Fig. 14 is a plan view of a further modification of the circular sort of our slide-rule equipped to solve in a more restricted range the same problem as the slide-rule shown in Figs. 4 and 5.

Inspection of the modification, Fig. 14, will show that it has upon an "oblong" base $A^{140}$ twin centers of revolution, the pivots $s^{140}$ $s^{140\times}$ upon which are mounted in two sets for rotative sliding disk-like "slides" $B^{142}$ $B^{143}$ and $B^{144}$ $B^{145}$, upon one set of which and the convenient adjacent part $A^{142}$ of base $A^{140}$ aforesaid are embodied (the detail of which it would be tedious herein to relate) all but one of the two unknown variables of the two equations of lathe No. 43, and upon the other set of slides $B^{144}$ $B^{145}$ and their adjacent base part or section $A^{142}$, the mechanical embodiment now too familiar to repeat of the other equation. Between these two circular slides is embodied upon base $A^{140}$ the familiar split scale, (here lettered $a^{147}$ $a^{147\times}$,) and drawn to it are directing-lines $l$ $l'$, which lead the eye from those scales of the two circular slides which carry the other unknown variable common to the formulæ or equation of lathe No. 43. This rule, Fig. 14, is also "set" to the identical problem of the rule described in connection with Figs. 4, 5, said setting being indicated by heavy-faced lines $i^{140}$, coincident in adjoining scales, and the answer revealed similarly designated. The rule in Fig. 4 is shown chiefly as illustrative of the scope which our invention affords for dealing with problems involving a duality in the way of unknown variables and the spreading asunder of the component mechanical embodiments of the independent sets of relations between the variables which are involved in any given problem of the classified sort, the whole preferably alining to a common field of vision in a preferably fixed middle part.

In all the embodiments of our invention the materials may be any customary or appropriate to slide-rules of their several general shapes.

The fact that the two equations thus embodied upon the above-described rules are not identical tends as we have contrived it in all the preferred self-contained embodiments. (See not only Figs. 1 2, 4 5, but also Figs. 12, 13, and 14 of the illustrative examples of our invention for problems involving among their variables two unknown ones to a mutual delimitation)—that is to say, to a delimitation by and between the ranges of result, which when any of the scales of said rules have been set to the requirements of a particular case are in their respective sections, as $A^{41}$ or $A^{42}$, Fig. 4, carried to and made to appear in a common field of vision, said common field of vision being that portion of the rule whereon after such setting similar graduations of the relatively sliding unknown variable scales in Fig. 4, $a^{46}$ $a^{48}$, concentrate. Brought to such a conjunction, if the answer be not then revealed by an exact coincidence among the graduations of the adjoining unknown variable scales the selection of the answer from said field of vision still becomes so readily reducible as to be practically instantaneous to the skilled user. Also before describing the modification shown in Fig. 15, and thereby extending our illustrative instruments to one dealing with more than two unknown variables, it is as well here to recapitulate and consider the instruments now described as group. The underlying principle of this group of instruments is the development of a slide-rule to solve that class of problems that involve two distinct or independent relations or equations between some or all of the variables of the problem. This end is in each said illustrative example accomplished by combining, as it were, two distinct slide-rules in one instrument, each rule (or as we have by reason of their merger into single instruments designated them each "rule-sections" thereof) being the mechanical embodiment of one of these distinct sets of relations or equations existing between the variables. In general the middle relatively fixed portion of these instruments of dual components being the most convenient place carries the split or duplex scale, as $a^7$ $a^{7\times}$, Fig. 1, representing one of the unknown variables, while on either flank thereof are the slides which carry to it, under the restrictive positions determined to them by the selected values of the known variable in any case, the other unknown variable, but there by reason of the difference in said equations in different and mutually delimiting scales. The two sets of distinct ratios of the two unknown variables of any case thus carried up and confronted in the rule are then so close together that the instrument in some instances (see Fig. 1) itself reveals at a glance in the coincidence of like graduations the answer; but if not by an absolute coincidence the observer in a similar occular way soon after and at a minimum of mechanical selection from the mutually delimiting and differently-dimensioned scales of the unknown variables discovers the answer.

Figure 15:
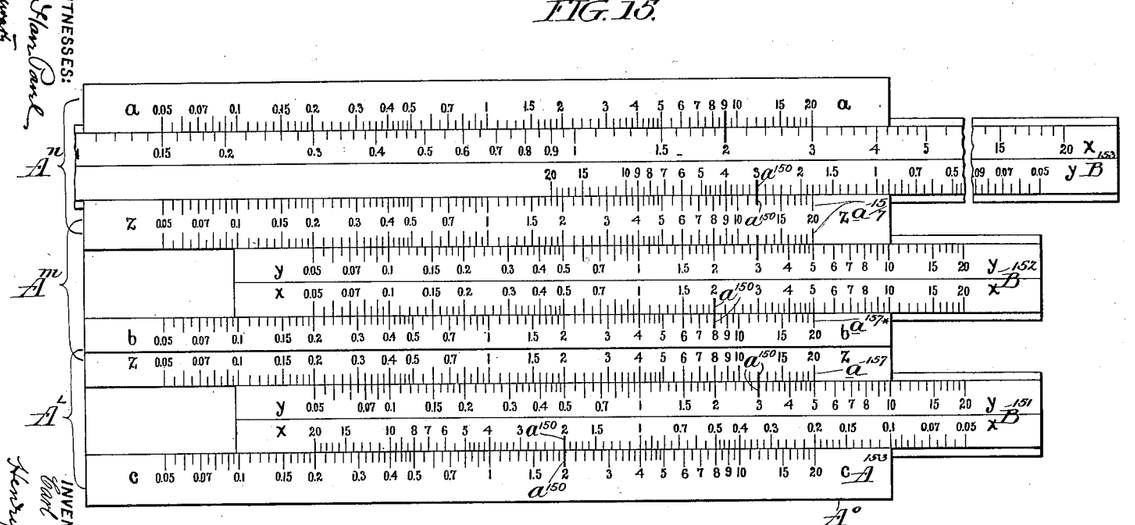
Fig. 15 is a plan view of a further modification of our invention, aimed to solve problems of the classified sort which involve more unknown variables than are involved in the problems solvable by the slide-rules shown in the prior figures.

In Fig. 15 is shown a slide-rule for the solution of a problem involving more than two—to wit, three—equations, and hence three unknown variables or quantities, the equations embodied on the instrument being (1.) $z\,y = d\,x^2$ (2.) $z\,x = b\,y$ (3.) $y\,x = \dfrac{x}{c}$, which solved for $z$ becomes (1.) $z = a\,\dfrac{x^2}{y}$ (2.) $z = b\,\dfrac{y}{x}$ (3.) $z = c\,x\,y$.

The embodiment, Fig. 15, shows by coincident heavy lines $z^{150}$, the solution of the equations for $a=9$, $b=8$, $c=2$, $x=2$ appearing opposite to the values of the variables $a\,b\,c$, and $y=3$, opposite in the section, appears opposite to $z=12$. The instrument consists in this case of three sections $A^l\,A^m\,A^n$, each being the embodiment of one of the aforesaid three equations, the sections $A^l$ and $A^m$ having the duplex $z$ scale $a^{157}$ $a^{157\times}$ in common, the third having the separate single $z$ scale $a^{15/7}$ of otherwise precisely the same proportions. In this rule the three slides $B^{151}$ $B^{152}$ $B^{153}$, being in shape and base engagement ordinary isolated T-section slides, need no descriptive text as to such detail. The adjusting of the slides $B^{151}$ $B^{152}$ $B^{153}$ of the instrument to show the solution of the problem in the above-indicated manner is, however, a tentative process only, the method of procedure being first to try the value of unity (1) for $x$ by setting $x=1$ opposite to the particular values of the case under consideration for the variables $a$, $b$, and $c$. By inspection we then readily see whether $x$ must be made greater or less than 1 in order to get coincident values of $y$ and $z$ in line with each other in all three sections of the instrument, and by a few successive readjustments the solution is soon affected. An instrument of this kind will be particularly useful in cases in which the unknown variables cannot have continuous values, but are confined to assume certain discontinuous values, for then a direct algebraic solution is impossible and a tentative algebraic solution very tedious.

In cases in which there are more than four variables in any of the three equations secondary slides carrying scales representing the additional variables can be introduced in an instrument of this kind in the same manner as in the instruments already described involving only two equations, (see Figs. 1, 2, 3, 4, and 5 to 11,) the variable in juxtaposition to the unknown variable $x$ being then the controlling one for this latter one.

Having now described our invention, what we claim as new, and desire to secure by Letters Patent, is—

1. A slide-rule for the solution of a problem involving a number of unknown variables; said rule comprising a relatively fixed part divided into sections, movable parts for these sections, scales carried by these fixed and movable parts representing the variables entering into the general problem of the rule, and all the scales appertaining to each section constituting together an embodiment of one of the independent sets of relations between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

2. A slide-rule for the solution of a problem involving a number of unknown variables; said rule comprising a relatively fixed part divided into sections, movable parts for these sections, scales carried by these fixed and movable parts representing the variables entering into the general problem of the rule, there being as many sections in the rule as there are unknown variables in the problem, and all the scales appertaining to each section constituting together an embodiment of one of the independent sets of relations, between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

3. A slide-rule for the solution of a problem involving a number of unknown variables; said rule comprising a relatively fixed part divided into sections, movable parts for these sections, scales carried by these fixed and movable parts representing the variables entering into the general problem of the rule, there being as many sections in the rule as there are unknown variables in the problem and at least one of these represented by a scale in each section, and all the scales appertaining to each section constituting together an embodiment of one of the independent sets of relations between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

4. A slide-rule for the solution of a problem involving a number of unknown variables; said rule comprising a relatively fixed part divided into sections, movable parts for these sections, scales carried by these fixed and movable parts representing the variables entering into the general problem of the rule, there being as many sections in the rule as there are unknown variables in the problem and one of these represented by a fixed scale in each section, and all the scales appertaining to each section constituting together an embodiment of one of the independent sets of relations between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

5. A slide-rule for the solution of a problem involving a number of unknown variables; said rule comprising a relatively fixed part divided into sections, movable parts for these sections, scales carried by these fixed and movable parts representing the variables entering into the general problem of the rule, there being as many sections in the rule as there are unknown variables in the problem and one of these represented by similarly-located fixed scales of equal magnitudes, one in each section, and all the scales appertaining to each section constituting together an embodiment of one of the independent sets of relations between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

6. A slide-rule for the solution of a problem involving a number of unknown variables, said rule comprising a relatively fixed part divided into sections, movable parts for these sections, scales carried by these fixed and movable parts representing the variables entering into the general problem of the rule, there being as many sections in the rule as there are unknown variables in the problem and one of these represented by a fixed scale in each section and another by a movable scale in each section in juxtalocation to said fixed scale, and all the scales appertaining to each section constituting together an embodiment of one of the independent sets of relations between the variables of the rule problem, or some of them, and coacting to locate the scales representing two of the unknown variables in their proper, mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

7. A slide-rule for the solution of a problem involving a number of unknown variables; said rule comprising a relatively fixed part divided into sections, movable parts for these sections, scales carried by these fixed and movable parts representing the variables entering into the general problem of the rule, there being as many sections in the rule as there are unknown variables in the problem and one of these represented by similarly-located fixed scales of equal magnitudes, one in each section, and another by a movable scale in each section in juxtalocation to said fixed scale, and all the scales appertaining to each section constituting together an embodiment of one of the independent sets of relations between the variables of the rule problem, or some of them, and coacting to locate the scales representing two of the unknown variables in their proper mutually-delimiting relation to each other, the rule-sections being assembled in the rule as described, and so that the scales thus located in the several sections will again coact by inspection to determine the values of the unknown variables which will satisfy all the relations severally embodied in the different sections of the rule.

8. A slide-rule for the solution of a problem involving two unknown variables; said rule comprising a relatively fixed part divided into two sections, movable parts for these sections, scales carried by these fixed and movable parts representing the variables entering into the general problem of the rule, and all the scales appertaining to each section constituting together an embodiment of one of the two independent sets of relations between the variables of the rule problem, or some of them, and coacting to locate the scales representing the two unknown variables in their proper, mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

9. A slide-rule for the solution of a problem involving two unknown variables; said rule comprising a relatively fixed part divided into two sections, movable parts for these sections, scales carried by these fixed and movable parts representing the variables entering into the general problem of the rule, and one of the two unknown variables being represented by a fixed scale in each section, and all the scales appertaining to each section constituting together an embodiment of one of the two independent sets of relations between the variables of the rule problem, or some of them, and coacting to locate the scales representing the two unknown variables in their proper mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

10. A slide-rule for the solution of a problem involving two unknown variables; said rule comprising a relatively fixed part divided into two sections, movable parts for these sections, scales carried by these fixed and movable parts representing the variables entering into the general problem of the rule, and one of the unknown variables being represented by similarly-located fixed scales of equal magnitudes, one in each section, and all the scales appertaining to each section constituting together an embodiment of one of the two independent sets of relations between the variables of the rule problem, or some of them, and coacting to locate the scales representing the two unknown variables in their proper, mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

11. A slide-rule for the solution of a problem involving two unknown variables; said rule comprising a relatively fixed part divided into two sections, movable parts for these sections, scales carried by these fixed and movable parts representing the variables entering into the general problem of the rule, and one of the two unknown variables being represented by a fixed scale in each section and the other by a movable scale in each section in juxtalocation to said fixed scale, and all the scales appertaining to each section constituting together an embodiment of one of the two independent sets of relations between the variables of the rule problem, or some of them, and coacting to locate the scales representing the two unknown variables in their proper, mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

12. A slide-rule for the solution of a problem involving two unknown variables, said rule comprising a relatively fixed part divided into two sections, movable parts for these sections, scales carried by these fixed and movable parts representing the variables entering into the general problem of the rule, and one of the two unknown variables being represented by similarly-located fixed scales of equal magnitudes, one in each section, and the other by a movable scale in each section in juxtalocation to said fixed scale, and all the scales appertaining to each section constituting together an embodiment of one of the two independent sets of relations between the variables of the rule problem, or some of them, and coacting to locate the scales representing the two unknown variables in their proper, mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

13. A slide-rule for the solution of a problem involving two unknown variables; said rule comprising a relatively fixed part divided into two sections, movable parts for these sections, scales carried by these fixed and movable parts representing the variables entering into the general problem of the rule, and one of the two unknown variables being represented by one fixed scale common to the two sections, and the other by a movable scale in each section in juxtalocation to said fixed scale, and all the scales appertaining to each section constituting together an embodiment of one of the two independent sets of relations between the variables of the rule problem, or some of them, and coacting to locate the scales representing the two unknown variables in their proper, mutually-delimiting relation to each other, the two rule-sections being assembled in the rule as described, and so that the scales so located in the two sections will again coact by inspection to determine the values of the two unknown variables which will satisfy both of the relations embodied in the two sections of the rule.

14. A slide-rule having relatively stationary and longitudinally-movable parts adapted to support and adjust the scales of the rule, and some of said parts recessed intermediate of their ends to receive detachable scale-strips, in combination with scale-strips adapted to fit and interlock in said recessed portion.

CARL G. BARTH.
HENRY L. GANTT.
FRED. W. TAYLOR.

Witnesses:
CHAS. F. MYERS,
D. STEWART.